United States Patent [19]

Kimura et al.

[11] 4,031,334

[45] June 21, 1977

[54] APPARATUS FOR MAGNETIC RECORDING AND/OR REPRODUCING OF SIGNALS RECEIVED BY ONE OR MORE SIGNAL RECEIVING DEVICES

[75] Inventors: Hiroyuki Kimura, Atsugi; Takahiko Saito, Kamakura, both of Japan

[73] Assignee: Sony Corporation, Tokyo, Japan

[22] Filed: Aug. 11, 1975

[21] Appl. No.: 603,537

[30] Foreign Application Priority Data

Aug. 14, 1974 Japan .............................. 49-97102

[52] U.S. Cl. ............................ 179/100.11; 360/61; 360/137; 340/147 LP

[51] Int. Cl.² ........................................ G11B 31/00

[58] Field of Search ......... 340/147 LP; 179/100.11; 360/61, 137

[56] References Cited

UNITED STATES PATENTS

| | | | |
|---|---|---|---|
| 3,025,498 | 3/1962 | Blodgett | 340/147 LP |
| 3,681,541 | 8/1972 | Dozier | 179/100.11 |
| 3,947,894 | 3/1976 | Chimura | 360/137 |

*Primary Examiner*—Harold I. Pitts
*Attorney, Agent, or Firm*—Lewis H. Eslinger; Alvin Sinderbrand

[57] ABSTRACT

An apparatus comprising a recording and/or reproducing device, one or more signal receiving devices, such as, AM, FM and short wave radio receivers or television receivers, each having a signal selector or tuner actuable to select the signal received by the respective signal receiving device, and a control system operable to select one of the signal receiving devices and to apply the signal therefrom to the recording and/or reproducing device for recording of such signal by the latter; is further provided with an arrangement by which actuation of each signal selector or tuner is prevented when the respective signal receiving device is selected to have the signal therefrom recorded, whereby to avoid inadvertent changing of the signal being recorded.

14 Claims, 13 Drawing Figures

APPARATUS FOR MAGNETIC RECORDING AND/OR REPRODUCING OF SIGNALS RECEIVED BY ONE OR MORE SIGNAL RECEIVING DEVICES

BACKGROUND OF THE INVENTION

1. Field of the Invention

This invention relates generally to apparatus in which a recording and/or reproducing device is combined with a signal receiving device, such as, a radio or television receiver, and more particularly is directed to improvements in apparatus of the described type in which the signal being received by a radio or television receiver may be simultaneously recorded by the assoicated recording and/or reproducing device.

2. Description of the Prior Art

Apparatus now exists in which a magnetic tape recorder is combined with a radio or television receiver, and in which the AM or FM broadcast signal received by the radio receiver or the broadcast video signal received by the television receiver can be easily recorded merely by setting the controls of the magnetic tape recorder for the recording operation of the latter. However, in such apparatus, the tuning control of the radio receiver or the channel selector of the television receiver may be inadvertently actuated during the recording of the signal being received by such radio or television receiver, with the result that the reception and recording of the desired signal may be interrupted.

OBJECTS AND SUMMARY OF THE INVENTION

Accordingly, it is an object of this invention to provide an apparatus of the above described type, that is, combining a recording device with at least one signal receiving device, and in which actuation of the signal selector or tuner of each signal receiving device is prevented during the time when the signal received by such device is being recorded.

Another object is to provide an apparatus, as aforesaid, in which a plurality of signal receiving devices are associated with a recording device so that the signal being received by any selected one of the signal receiving devices may be recorded, and in which the actuation of the signal selector or tuner of each signal receiving device is prevented only when such signal receiving device is selected for recording of the signal being received thereby.

Still another object is to provide an apparatus, as aforesaid, in which, during the recording of the signal being received by a selected one of the signal receiving devices, either the signal being recorded or the signal being received by another one of the signal receiving devices can be effectively monitored, with the signal selector or tuner of such other signal receiving device being free to be actuated for changing the signal received thereby.

In accordance with an aspect of this invention, an apparatus is provided with a recording device, at least one signal receiving device including signal selecting means actuable to select the signal received by said signal receiving device, control means operable for applying the signal received by said signal receiving device to the recording device for recording by the latter, and means preventing actuation of the signal selecting means upon operation of the control means so as to avoid changing of the signal selected for reception by the signal receiving device during recording of such signal.

In apparatus according to preferred embodiments of the invention, a plurality of signal receiving devices are combined with the recording device, the control means is operable to select one of the signal receiving devices and to apply to the recording device the signal being received by the selected signal receiving device for recording of such signal, and actuation of only the signal selecting means of the selected signal receiving device is prevented during the operation of the control means to apply to the recording device the signal being received by the selected signal receiving device, whereby to avoid the inadvertent changing of the signal being recorded, while the signal selecting means of the other or non-selected signal receiving devices are free to be actuated for changing the signal being received by each of such other signal receiving devices.

The above, and other objects, features and advantages of the present invention, will be apparent from the following detailed description of illustrative embodiments thereof which is to be read in connection with the accompanying drawings.

BRIEF DESCRIPTION OF THE DRAWINGS

FIGS. 3A, 3B and 3C are perspective views of individual control members included in the control section of FIGS. 1 and 2, while FIG. 3D is a perspective view of a master control member also included in such control section;

DESCRIPTION OF THE PREFERRED EMBODIMENTS

Figure 4:
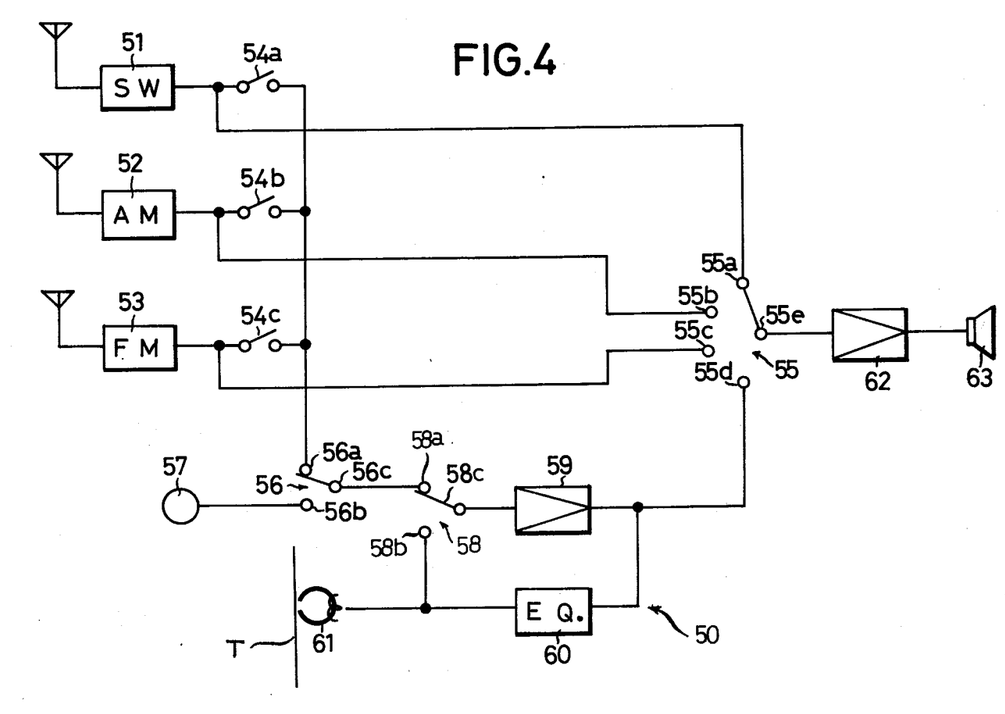
FIG. 4 is a circuit diagram illustrating an apparatus according to this invention which combines a magnetic tape recording and/or reproducing device with AM, FM and short wave radio receivers, and with which the control section of FIGS. 1 and 2 is to be employed.

Referring to the drawings in detail, and initially to FIG. 4 thereof, it will be seen that an apparatus according to this invention may generally comprise a magnetic tape recording and/or reproducing device 50 combined with a plurality of signal receiving devices 51, 52 and 53 which are shown to be respectively constituted by short wave, AM and FM radio receivers. Normally open, individually operable switches 54a, 54b and 54c are connected in parallel between the outputs of receivers 51, 52 and 53, respectively, and a fixed contact 56a of a recording source selecting switch 56 which further has a fixed contact 56b that may be connected to a microphone 57. The recording source selecting switch 56 further has a movable contact 56c selectively engageable with the fixed contacts 56a and 56b and being connected to a fixed contact 58a of a record-reproduce switch 58 by which the recording or reproducing operation of device 50 is selected. the record-reproduce switch 58 is further shown to have a second fixed contact 58b and a movable contact 58c which is selectively engageable with fixed contacts 58a and 58b and connected to the input of a line amplifier 59. The output of line amplifier 59 is connected through a suitable equalizer circuit 60 to a magnetic head 61 which is operative to record and reproduce audio signals on a magnetic tape T. The head 61 is also shown to be connected to fixed contact 58b of record-reproduce switch 58, while the output of line amplifier 59 is shown to be also connected to a fixed contact 55d of a monitor switch 55. The monitor switch 55 is further shown to have fixed contacts 55a, 55b and 55c connected directly to the outputs of radio receivers 51, 52 and 53, respectively, and a movable contact 55e selectively engageable with the fixed contacts 55a–55d and being connected through a power amplifier 62 to an electric-audio transducer, such as a loudspeaker 63.

With the apparatus, as shown in FIG. 4 and described above, record-reproduce switch 58 may be normally disposed with its movable contact 58c engaging fixed contact 58b for selecting the reproducing operation of device 50. For such reproducing operation of device 50, monitor switch 55 is disposed with its movable contact 55e engaging fixed contact 55d so that signals reproduced from tape T by head 61 are supplied through switch 58, line amplifier 59, switch 55 and power amplifier 62 to loudspeaker 63 for the audible reproduction of such signals.

However, when it is desired to select the recording operation of device 50, switch 58 is changed over to the condition shown on FIG. 4, that is, to engage its movable contact 58c with fixed contact 58a. With switch 58 thus positioned for a recording operation, recording source selecting switch 56 may be disposed with its movable contact 56c in engagement with fixed contact 56b so that the signals recorded on tape T by head 61 will be those derived from microphone 57. Alternatively, with switch 56 positioned as shown on FIG. 4, that is, with its movable contact 56c engaging fixed contact 56a, the recording operation of device 50 is effective to record on tape T the signal being received by any one of the radio receivers 51, 52 and 53 as determined by closing of the respective individual control switch 54a, 54b or 54c. During the recording of a signal from a selected one of the radio receivers 51, 52 and 53, monitor switch 55 may be disposed with its movable contact 55e engaging any one of fixed contacts 55a, 55b and 55c so as to cause loadspeaker 63 to audibly reproduce or monitor either the signal from the selected radio receiver, that is, the signal being recorded, or the signal from another one of the radio receivers 51, 52 and 53.

Of course, each of the radio receivers 51, 52 and 53 is provided with a tuning or signal selecting means by which the respective receiver can be tuned or adjusted to receive the signal broadcast by a selected station within the respective frequency band. Thus, the danger exists that, during a recording operation of device 50 for recording the signal being received by a selected one of receivers 51, 52 and 53, the tuning or signal selecting means of such selected receiver may be inadvertently actuated or adjusted so as to change or interrupt the signal being received and recorded on tape T. In order to avoid the foregoing problem, the apparatus shown on FIG. 4 may be provided with a control section according to this invention as shown on FIGS. 1 and 2.

Figure 1:
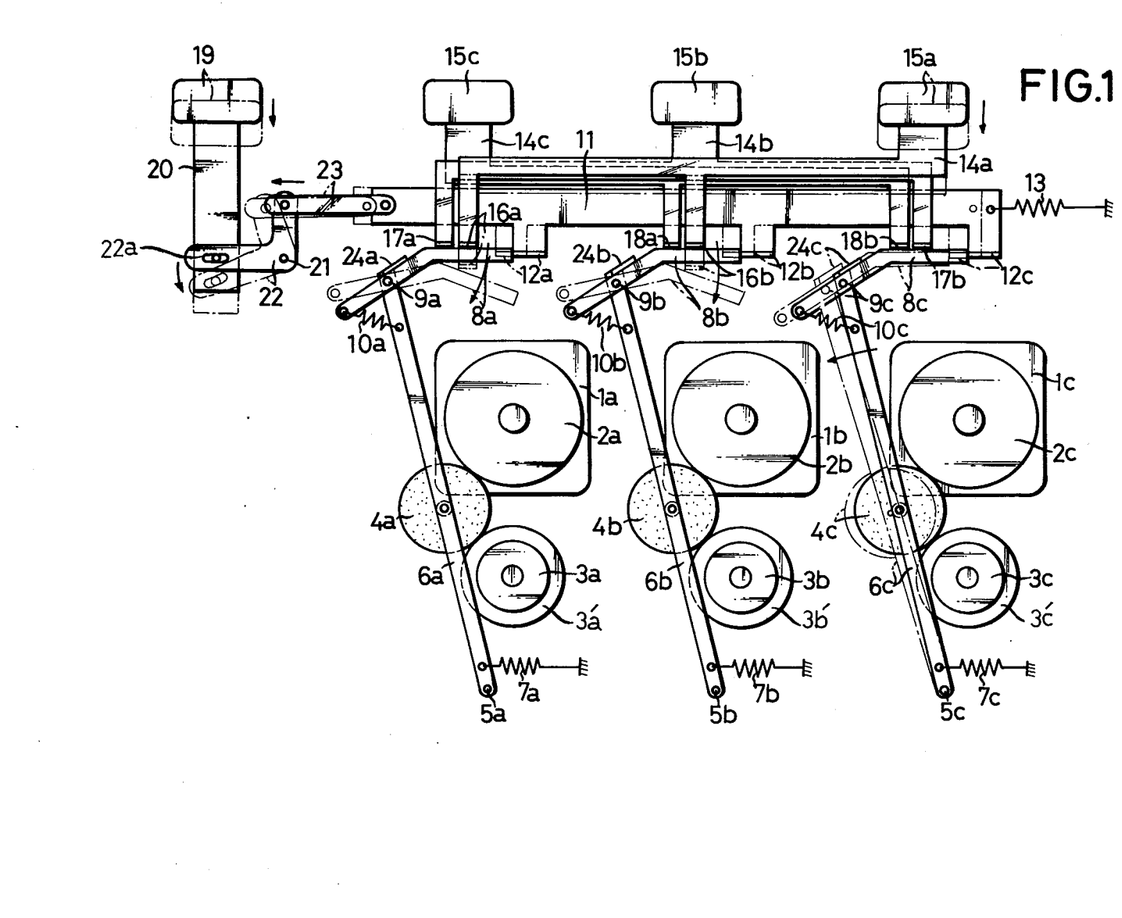
FIG. 1 is a schematic front elevational view of the control section of an apparatus according to one embodiment of the present invention.
Figure 2:
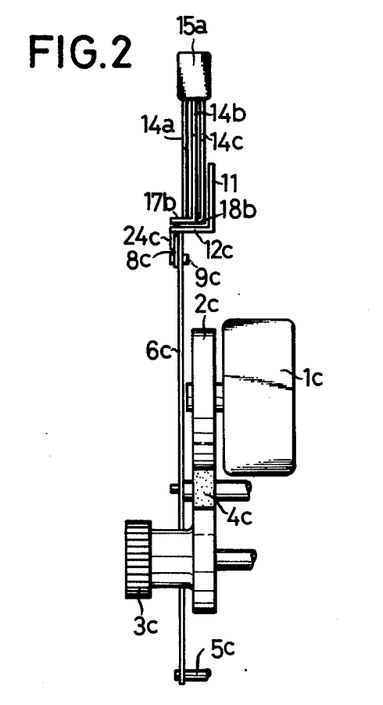
FIG. 2 is a schematic side elevational view of the control section shown in FIG. 1.

As shown on FIG. 1, the turning or signal selecting means for the several radio receivers may include variable condensers 1a, 1b and 1c for frequency tuning in the FM, AM and short wave bands, respectively. The variable condensers 1a, 1b and 1c may be arranged side-by-side, as shown, and provided with tuning wheels 2a, 2b and 2c, respectively, which may be turned to vary the respective condensers. Drive means are respectively associated with the variable condensers 1a, 1b and 1c and include manually rotatable tuning knobs 3a, 3b and 3c with drive wheels 3'a, 3'b and 3'c either connected or formed integrally with tuning knobs 3a, 3b and 3c, respectively, and idler wheels 4a, 4b and 4c for providing driving connections between the driving wheels 3'a, 3'b and 3'c and the respective tuning wheels 2a, 2b and 2c. Idler wheels 4a, 4b and 4c are rotatably mounted on support members 6a, 6b and 6c which are pivotally mounted at their lower ends, as at 5a, 5b and 5c. Springs 7a, 7b and 7c are connected to support members 6a, 6b and 6c, respectively, for urging such support members in the clockwise direction, as viewed on FIG. 1, to engaged positions shown in full lines and in which the respective idler wheels 4a, 4b and 4c engage the tuning and driving wheels 2a and 3'a, 2b and 3'b, and 2c and 3'c, respectively. Further, each of support members 6a, 6b and 6c is movable individually against the force of the respective spring 7a, 7b or 7c to a disengaged position, for example, as shown in broken lines in respect to support member 6c on FIG. 1, and in which the respective idler wheel 4a, 4b or 4c is spaced from the tuning and driving wheels 2a and 3'a, 2b and 2'b, or 2c and 3'c, respectively. It will be apparent that, when any one of support members 6a, 6b and 6c is displaced to its disengaged position, the respective variable condenser 1a, 1b or 1c cannot be adjusted or varied in response to rotation of the respective tuning knob 3a, 3b or 3c with the result that the tuning frequency preset by means of the variable condenser 1a, 1b or 1c cannot be inadvertently changed.

In order to effect the selective movement of support members 6a, 6b and 6c to their disengaged positions, interlock members or levers 8a, 8b and 8c are pivotally mounted, intermediate their ends, on pivot pins 9a, 9b and 9c carried by the upper ends of support members 6a, 6b and 6c, respectively. Springs 10a, 10b and 10c are connected between support members 6a, 6b and 6c and one end of the interlock levers 8a, 8b and 8c, respectively, for urging the latter in the counterclockwise direction, as viewed on FIG. 1, to abut against stop lugs 24a, 24b and 24c on the respective support members, and thereby establish the normal active positions of interlock levers 8a, 8b and 8c shown in full lines on FIG. 1. In such normal active positions, interlock levers 8a, 8b and 8c are respectively engageable by flanges or projections 12a, 12b and 12c depending from a laterally slidable master control member or slide plate 11 which is suitably mounted for movement in respect to a chassis or frame (not shown) of the apparatus between an inoperative position, shown in full lines on FIG. 1 and to which slide plate 11 is urged by a spring 13, and an operative position shown in broken lines.

The control section of an apparatus according to this invention is further shown to comprise individual control members 14a, 14b and 14c which extend alongside the master control member or slide plate 11 and are suitably mounted in respect to the frame (not shown) for individual vertical movements between raised inoperative positions shown in full lines on FIG. 1 and depressed or lowered operative positions, as shown in broken lines in respect to the individual control member 14a. The individual control members 14a, 14b and 14c are urged upwardly to their inoperative positions, and for example, by means of springs (not shown), and push-buttons 15a, 15b and 15c are provided on individual control members 14a, 14b and 14c, respectively, at spaced apart locations, so that any one of the push-buttons 15a, 15b and 15c may be manually depressed for moving the respective individual control member downwardly to its operative position. When any one of individual control members 14a, 14b and 14c is thus selectively moved downwardly to its operative position, such individual control member may be automatically locked in its operative position by means of a conventional locking mechanism (not shown) until the locking mechanism is conventionally released for permitting the return of the previously depressed individual control member to its raised inoperative position.

Figures 3A, 3B:
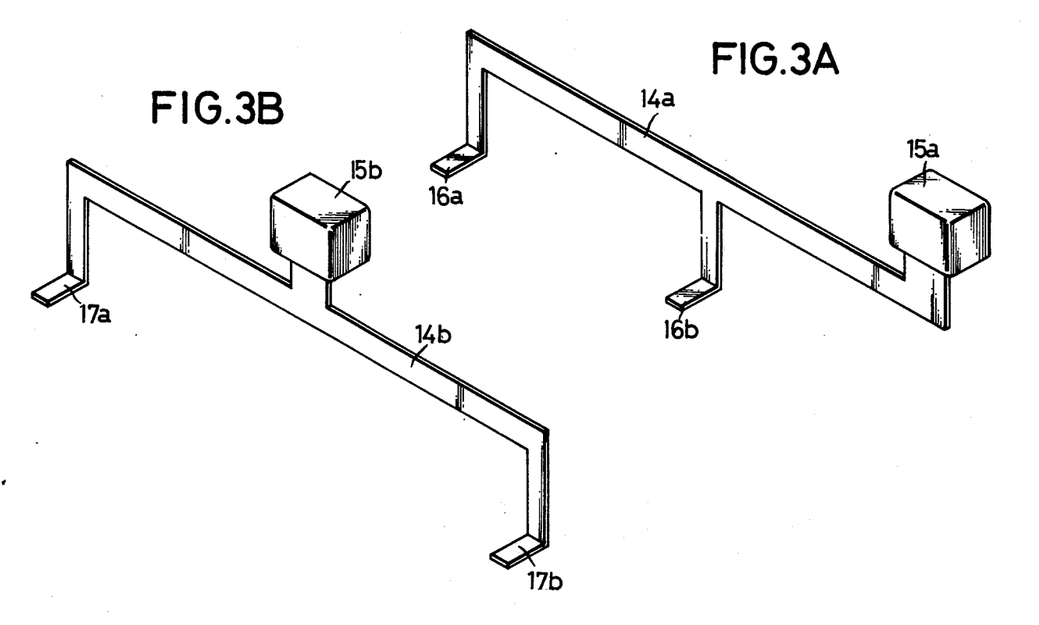
Figures 3C, 3D:
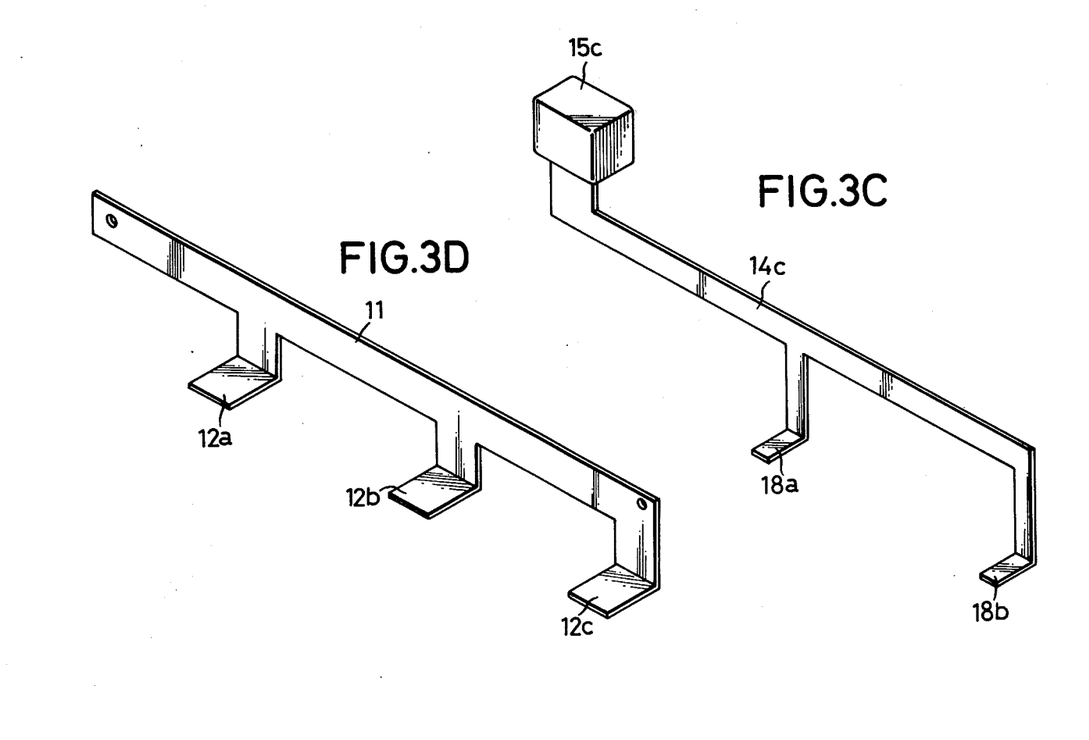

The individual control member 14a (FIGS. 1 and 3A) is shown to have a pair of depending projections 16a and 16b which are spaced apart along control member 14a so as to be disposed above interlocked levers 8a and 8b, respectively. Individual control member 14b (FIGS. 1 and 3B) also has a pair of depending projections 17a and 17b, however, such projections 17a and 17b are spaced apart so as to be disposed above interlock levers 8a and 8c, respectively. Similarly, individual control member 14c (FIGS. 1 and 3C) has a pair of depending projections 18a and 18b which are spaced apart so as to be disposed above the interlock levers 8b and 8c. By reason of the foregoing projections depending from the several individual control members, interlock levers 8a and 8b are angularly displaced to their inactive positions by means of projections 16a and 16b on control member 14a when the latter is depressed to its operative position, as shown in broken lines on FIG. 1, whereby interlock levers 8a and 8b are disengaged from the respective projections 12a and 12b on slide plate 11 so that the latter can move laterally to its operative position without effecting movements of support members 6a and 6b to their disengaged positions. Of course, when individual control member 14a is depressed to its operative position, interlock member or lever 8c remains in its active position in engagement with projection 12c so that the subsequent lateral movement of slide plate 11 to its operative position is transmitted through projection 12c and interlock lever 8c to cause movement of support member 6c to its disengaged position, as shown in broken lines on FIG. 1. Thus, movement of individual control member 14a to its depressed operative position is effective to prevent any further adjustments of variable condenser 1c by turning of the respective tuning knob 3c so that the short wave receiver 51 remains tuned to the preset frequency. However, the drive means for the variable condensers 1a and 1b remain engaged so that the AM and FM receivers 52 and 53 can be retuned, as desired, by manual turning of the respective tuning knobs 3B and 3A.

Similarly, when individual control member 14b is depressed to its operative position, projections 17a and 17b angularly displace interlock levers 8a and 8c to their inactive positions so that subsequent movement of slide plate 11 to its operative position causes projection 12b to act through interlock lever 8b on support member 6b for moving the latter to its disengaged position, while support members 6a and 6c remain in their engaged positions. Thus, movement of control member 14b to its depressed operative position causes disengagement of the drive means for variable condenser 1b and thereby ensures that the AM receiver 52 will not be inadvertently changed from its preset frequency, while variable condensers 1a and 1c can still be adjusted by turning of the respective tuning knobs 3a and 3c for changing the frequencies to which the FM receiver 53 and the short wave receiver 51 are respectively tuned. Finally, when individual control member 14c is depressed to its operative position, projections 18a and 18b thereon displace interlock levers 8b and 8c to their inactive positions, while interlock lever 8a remains in its active position engaged with projection 12a. Therefore, when slide plate 11 is subsequently displaced laterally to its operative position, support member 6a is moved to its disengaged position for disengaging the drive means for variable condenser 1a, thereby to prevent inadvertent tuning of the FM receiver 53 away from its preset frequency. However, since the drive means for variable condensers 1b and 1c remain engaged, the AM receiver 52 and the short wave receiver 51 can be tuned to any desired frequencies by manipulation of the respective tuning knobs 3b and 3c.

The individual control members 14a, 14b and 14c are further adapted to actuate the individual control switches 54a, 54b and 54c (FIG. 4), respectively, so that each of such switches 54a, 54b and 54c is selectively changed-over from its normal open condition to its closed condition in response to the movement of the respective control member 14a, 14b or 14c to its depressed operative position. Further, the record-reproduce switch 58 (FIG. 4) is suitably actuated in response to movements of master control member or slide plate 11 so that movable contact 58c engages fixed contact 58b for selecting the reproducing mode of operation of recording and/or reproducing device 50 when slide plate 11 is in its inoperative position shown in full lines on FIG. 1, whereas, movement of slide plate 11 to its operative position shown in broken lines on FIG. 1, is effective to change over switch 58 for selecting the recording mode of operation of device 50, that is, for engaging movable contact 58c with fixed contact 58a.

In order to effect movement of slide plate 11 from its inoperative position to its operative position for selecting the recording mode of operation of device 50, a pushbutton 19 (FIG. 1) is provided on the upper end of a plunger 20 which is suitably mounted in the frame (not shown) of the apparatus for vertical movements relative to such frame, that is, for movements at right angles to the direction of movement of slide plate 11. A bellcrank 22 is pivotally mounted, as at 21, and has one of its ends connected to plunger 20, as by a pin and slot connection 22a, while the opposite end of bellcrank 22 is pivotally connected to a link 23 which is, in turn, pivotally connected to the adjacent end of slide plate 11. Thus, when pushbutton 19 is manually depressed from its raised inoperative position, shown in full lines on FIG. 1, to its depressed operative position shown in broken lines, bellcrank 22 and link 23 translate the corresponding movement of plunger 20 into movement of slide plate 11 laterally from its inoperative position ot its operative position. A conventional locking mechansim (not shown) may be associated with plunger 20 so as to retain pushbutton 19 in its depressed operative position, and thereby maintain the recording mode of operation of device 50, until such time as a stop button (not shown) is actuated to release the locking mechanism associated with plunger 20 and thereby permit spring 13 to return slide plate 11 and pushbutton 19 to their respective inoperative positions.

The above described apparatus according to this invention operates as follows:

Assuming that it is desired to record a short wave broadcast signal, the desired broadcast frequency or station is first selected by rotating tuning knob 3c so as to suitably adjust the respective variable condenser 1c. Thereafter, with switch 56 disposed to engage its movable contact 56c with fixed contact 56a, pushbutton 15a is depressed to effect corresponding downward movement of the associated control member 14a to its depressed operative position, at which such control member is locked. As previously described, movement of control member 14a to its depressed operative position is effective to displace interlock levers 8a and 8b to their inactive positions and further to actuate or change-over switch 54a to its closed condition, whereby the signal being received by the short wave receiver 51 is applied through switch 56 to contact 58 of the record-reproduce switch 58. Then, push-button 19 is depressed to its operative position and suitably locked thereat for establishing the recording mode of operation of device 50. In response to such movement of pushbutton 19 to its operative position, slide plate 11 is displaced laterally to its operative position and switch 58 is changed-over to engage its movable contact 58c with fixed contact 58a. Thus, the signal being received by short wave receiver 51 is supplied through switch 58, line amplifier 59 and equalizer circuit 60 to head 61 for recording by the latter on tape T. Furthermore, the movement of slide plate 11 to its operative position shown in broken lines on FIG. 1 causes support member 6c to be displaced to its disengaged position by the action of flange or projection 12c of slide plate 11 on interlock lever 8c. With support member 6c thus moved to its disengaged position, idler 4c is spaced from drive wheel 3'c and tuning wheel 2c. Therefore, during the recording of a signal being received by short wave receiver 51, the frequency to which the receiver 51 is tuned cannot be changed by reason of the spacing of idler wheel 4c from drive wheel 3'c and tuning whell 2c. In other words, the frequency to which receiver 51 is tuned is locked to the preset frequency and cannot be changed during the recording operation even though the tuning knob 3c may be inadvertently turned. Of course, when the usual stop button (not shown) is actuated for releasing the lock mechanism (not shown) associated with plunger 20 and thereby permitting return of pushbutton 19 to its raised inoperative position, slide plate 11 is returned by spring 13 to its inoperative position shown in full lines on FIG. 1 with the result that switch 58 is changed-over to engage its movable contact 58c with fixed contact 58b, that is, for reestablishing the reproducing mode of operation of device 50. Upon such return of slide plate 11 to its inoperative position, support member 6c is restored to its engaged position by the respective spring 7c whereupon idler wheel 4c again engages drive wheel 3'c and tuning wheel 2c so that short wave receiver 51 can be tuned to a new or different frequency by rotation of tuning knob 3c.

During the recording of the signal being received by short wave receiver 51, as described above, either such signals being recorded or signals being received by the AM receiver 52 or the FM receiver 53 may be monitored by way of power amplifier 62 and loudspeaker 63 by suitable positioning of monitor switch 55. Thus, if movable contact 55e of monitor switch 55 is engaged with contact 55a during the recording of the signal being received by short wave receiver 51, such signal will also be supplied through monitor switch 55 and power amplifier 62 to loudspeaker 63 so as to be audibly reproduced by the latter. However, during the recording of the signal being received by short wave receiver 51, as described above, monitor switch 55 may be disposed with its movable contact 53e engaging either fixed contact 55b or fixed contact 55c with the result that the loudspeaker 63 will then audibly reproduce either the signal being received by AM receiver 52 or the signal being received by FM receiver 53, respectively. Further, since the apparatus according to this invention prevents actuation of only the variable condenser 1c of the short wave receiver 51 during recording of the signal being received by the latter, either the tuning knob 3a or the tuning knob 3b can be manipulated to change the frequency to which the FM receiver 53 or the AM receiver 52, respectively, is tuned while the signal being received by the FM receiver or the AM receiver is being passed through monitor switch 55 for audible reproduction by loudspeaker 63.

Although the recording operation of the apparatus according to this invention has been described above for the situation where pushbutton 15a is depressed for selecting short wave receiver 51 as the source of the recorded signal, it will be apparent that either pushbutton 15b or pushbutton 15c may be depressed for selecting either the AM receiver 52 or the FM receiver 53, respectively, as the source of the signal to be recorded. It will be apparent that, when the AM receiver 52 is selected as the source of the signals to be recorded, the drive means for adjusting the respective variable condenser 1b is rendered inoperative to prevent changing of the frequency to which receiver 52 is tuned during the recording of the signal therefrom, while either the signal from the short wave receiver 51 or the signal from the FM receiver 53 can be applied through monitor switch 55 to loudspeaker 63 for audible reproduction by the latter, with either the variable condenser 1a or 1c being adjustable by turning of the respective tuning knob 3a or 3c for selecting the station to which the short wave receiver or the FM receiver is tuned. Similarly, when the pushbutton 15c is depressed to select the FM receiver 53 as the source of the signal being recorded, the drive means for the variable condenser 1a is rendered inoperative so that the frequency to which the FM receiver is tuned cannot be changed during the recording of the signal therefrom, whereas the tuning of either the short wave receiver 51 or the AM receiver 52 can be changed at will to select a desired program for simultaneous audible reproduction by loudspeaker 63.

In the control section for an apparatus according to this invention as described above with reference to FIGS. 1 and 2, the variable condensers 1a, 1b and 1c for controlling the tuning of the FM receiver 53, the AM receiver 52 and the short wave receiver 51 have been described and shown as being mounted side-by-side with their respective tuning wheels 2a, 2b and 2c being rotatable about parallel, spaced apart axes in response to rotation of respective tuning knobs 3a, 3b and 3c. However, the present invention may be employed with other arrangements of the variable condensers. For example, as shown on FIGS. 5 and 6, in which parts of the control section corresponding to those described above with reference to FIGS. 1 and 2 are identified by the same reference numerals, the variable condensers 1a,1b and 1c may be arranged or mounted in coaxial, spaced apart relation so that their respective tuning wheels 2a,2b and 2c will also be coaxial and axially spaced from each other. Further, in the embodiment of FIGS. 5 and 6, the drive means for adjusting variable condensers 1a,1b and 1c include drive wheels 28a, 28b and 28c secured at axially spaced apart locations on a common shaft 27 which is rotatably mounted with its axis extending parallel to the axis of variable condensers 1a,1b and 1c. A single knob 29 is secured on shaft 27 for simultaneously rotating the three drive wheels on the latter. The idler wheels 4a,4b and 4c which are adapted to transmit rotary movements from drive wheels 28a,28b and 28c to tuning wheels 2a,2b and 2c, respectively, are rotatably mounted on the support members 6a,6b and 6c which, at their lower ends, are pivotally mounted on a single pivot pin 30 which extends parallel to shaft 27 so that such support members 6a,6b and 6c are swingable in parallel planes, rather than in a common plane, as in the embodiments of FIGS. 1 and 2.

Figure 5:
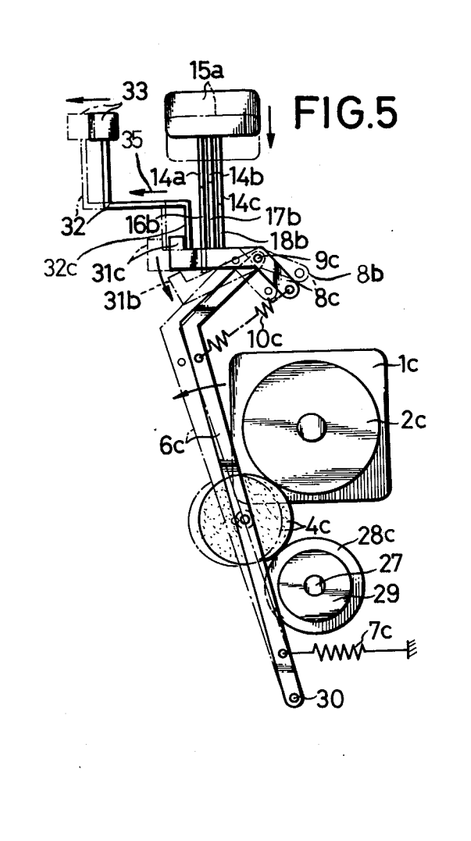
FIG. 5 is a schematic front elevational view similar to that of FIG. 1, but showing a control section for an apparatus according to another embodiment of this invention.
Figure 6:
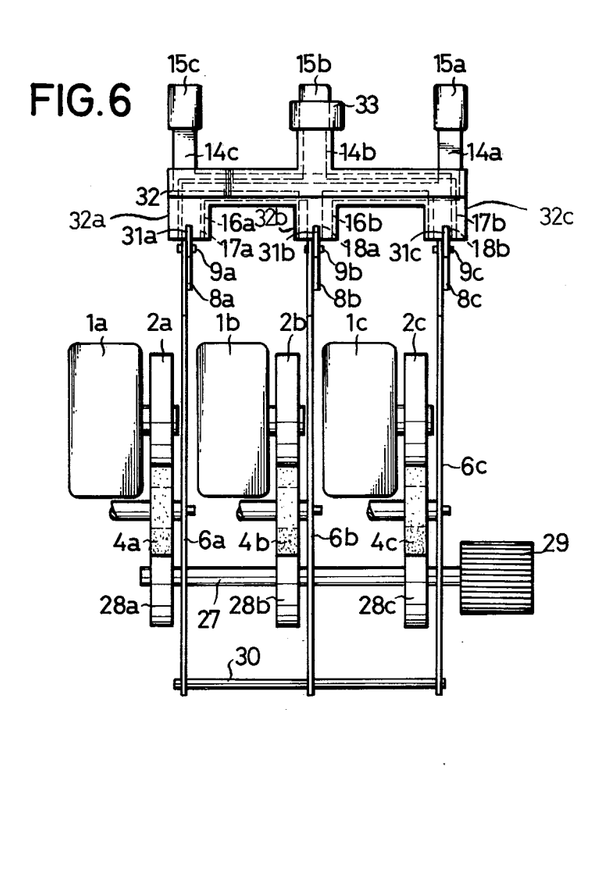
FIG. 6 is a schematic side elevational view of the control section appearing on FIG. 5.
Figure 7A:
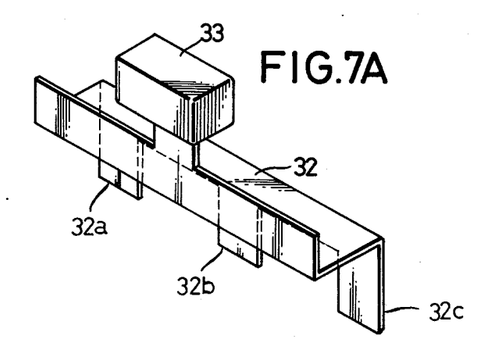
FIGS. 7A, 7B, 7C and 7D are perspective views of respective control members included in the control section of FIGS. 5 and 6.
Figure 7B:
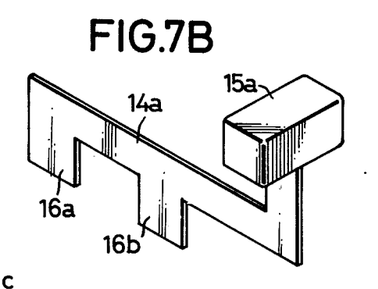
Figure 7C:
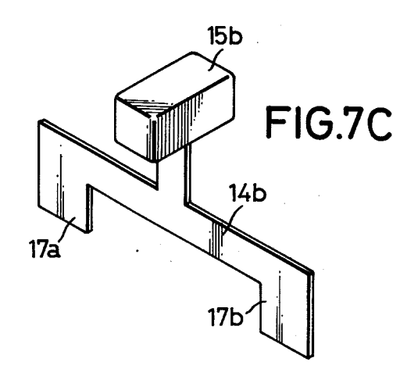
Figure 7D:
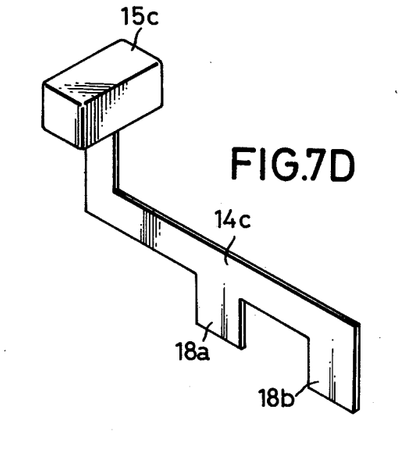

As in the previously described embodiment, support members 6a,6b and 6c have interlock members or levers 8a,8b and 8c pivotally mounted at their upper ends, and individual control members 14a,14b and 14c illustrated in detail on FIGS. 7b,7c and 7d are suitably mounted above the interlock levers and are movable vertically independently of each other by means of respective pushbuttons 15a,15b and 15c for selectively displacing interlock levers 8a,8b and 8c from their raised active positions to depressed inactive positions. However, in the embodiment of FIGS. 5 and 6, interlock levers 8a,8b and 8c are formed with upwardly directed projections 31a,31b and 31c, respectively, at one end thereof for engagement, in the raised active positions of the respective interlock levers, with depending projections 32a,32b and 32c provided on a master control member 32 (FIGS. 5,6 and 7A). Such master control member 32 which is provided with an actuating knob 33 is mounted for movement in the direction of the arrow 35 on FIG. 5, that is, in the direction at right angles to that in which the individual control member 14a,14b and 14c extend, between an inoperative position shown in full lines on FIG. 5 and an operative position shown in broken lines. The control section of FIGS. 5 and 6 may be associated with the remainder of the apparatus shown on FIG. 4 in substantially the same manner as has been described above in respect to the control section of FIGS. 1 and 2, that is, the individual control members 14a,14b and 14c may be effective to close the individual control switches 54a,54b and 54c when selectively depressed to their operative positions, while the master control member 32 may be effective to change-over the record-reproduce switch 58 from its reproduce condition, that is, the condition in which movable contact 58c engages fixed contact 58b, to its record condition shown on FIG. 4 in response to movement of master control member 32 from its inoperative position to its operative position.

The control section of FIGS. 5 and 6 operates as follows:

When, for example, pushbutton 15a is depressed to move the respective individual control member 14a to its operative position, projections 16a and 16b depending from control member 14a act on interlock levers 8a and 8b to turn the latter in the counterclockwise direction, as viewed on FIG. 5, from their active positions to their inactive positions, for example, as indicated in broken lines in respect to interlock lever 8b, whereby the projections 31a and 31b on interlock levers 8a and 8b are separated downwardly from the respective projections 32a and 32b on master control member 32. Furthermore, the movement of individual control member 14a to its operative position is effective to close the associated control switch 54a. Following the movement of individual control member 14a to its operative position, button 33 for selecting the recording operation is displaced toward the left, as viewed on FIG. 5, for moving master control member 32 from its inoperative position to its operative position shown in broken lines and, as a consequence of such movement, changing over switch 58 to the position shown on FIG. 4. Further, by reason of the continued engagement of the projection 31c on interlock lever 8c with the respective projection 32c on master control member 32, the movement of master control member 32 to its operative position is effective to turn support member 6c to its disengaged position shown in broken lines on FIG. 5, with the result that the respective idler wheel 4c is disengaged or spaced from the respective drive wheel 28c on shaft 27 and tuning wheel 2c of variable condenser 1c. Thus, as in the first described embodiment of the invention, changing of the frequency to which the short wave receiver 51 is tuned by the respective variable condenser 1c is prevented during the recording by the device 50 of the signal being received by such short wave receiver. During such recording of the signal being received by short wave receiver 51, rotation of tuning knob 29 is effective to cause adjustment of variable condensers 1a and 1b by reason of the continued engagement of idler wheels 4a and 4b with drive and tuning wheels 28a and 2a, and with drive and tuning wheels 28b and 2b, respectively. Therefore, as in the first described embodiment, during recording of a signal being received by short wave receiver 51, the frequencies to which the AM and FM receivers 52 and 53 are tuned can be changed, while monitor switch 55 can be changed-over, as desired, to permit either the signal being received by AM receiver 52, or the signal being received by FM receiver 53 to be supplied through power amplifier 62 to loudspeaker 63 for audible reproduction of such signal. Having described the operation of the control section of FIGS. 5 and 6 in connection with the recording of the signal being received by short wave receiver 51, it will be apparent that corresponding operations occur when either pushbutton 15b or pushbutton 15c is depressed for selectively causing the recording of the signal being received by AM receiver 52 or FM receiver 53, respectively.

The embodiments of the invention shown on FIGS. 1 and 2 and FIGS. 5 and 6 have been described above as being applied to apparatus in which an audio tape recording and/or reproducing device is combined with a plurality of radio receivers. However, it will be apparent that the present invention can be similarly applied to any other apparatus in which a recording and/or reproducing device is associated with one or more signal receiving devices, such as, a video tape recorder combined with one or more television receivers.

Although embodiments of this invention have been described in detail herein with reference to the accompanying drawings, it is to be understood that the invention is not limited to those precise embodiments, and that various modifications and changes may be effected therein by one skilled in the art without departing from the scope or spirit of the invention as defined in the appended claims.

What is claimed is:

1. An apparatus comprising a recording device, at least one original receiving device including tunable signal selecting means operable to tune said receiving device to any one of plural signal channels so as to select the signal received by said signal receiving device, control means selectively operable for applying the signal received by said signal receiving device to said recording device for recording by the latter, and means responsive to the operation of said control means for maintaining the tuning condition of said signal selecting means at the one signal channel to receive said signal and for preventing said signal selecting means from being tuned to a different signal channel so as to avoid changing of the signal selected for reception by said signal receiving device during recording of said signal.

2. An apparatus according to claim 1; in which said means for preventing said signal selecting means from being tuned to a different signal channel includes drive means engageable with said signal selecting means to permit tuning of said signal selecting means by way of said drive means, and means for disengaging said drive means from said signal selecting means in response to operation of said control means.

3. An apparatus comprising a recording device, at least one original receiving device including signal selecting means actuable to select the signal received by said signal receiving device, control means operable for applying the signal received by said signal receiving device to said recording device for recording by the latter, drive means engageable with said signal selecting means to permit actuation of said signal selecting means by way of said drive means, and means for disengaging said drive means from said signal selecting means upon operation of said control means so as to avoid changing of the signal selected for reception by said signal receiving device during recording of said signal, in which said drive means includes a manually rotatable tuning knob, an idler wheel for providing a driving connection between said tuning knob and said signal selecting means in the engaged condition of said drive means, and a support member carrying said idler wheel and being movable between an engaged position, in which said idler wheel engages said tuning knob and said signal selecting means, and a disengaged position, in which said idler wheel is spaced from at least one of said tuning knob and signal selecting means; and in which said means for disengaging said drive means includes means for moving said support member to said disengaged position upon said operation of the control means.

4. An apparatus according to claim 3; in which said control means includes switch means having a normal open state and being actuable to a closed state for connecting said signal receiving device to said magnetic recording device, and a control member operable to actuate said switch means to said closed state thereof.

5. An apparatus comprising a magnetic recording device, a plurality of signal receiving devices each including signal selecting means actuable to select any one of plural signals for reception by the respective signal receiving device, control means selectively operable to select one of said plural signal receiving devices for applying to said recording device the signal being received by the selected signal receiving device for recording of such signal, and means responsive to the operation of said control means for maintaining the signal being received by said selected signal receiving device and for preventing actuation of the signal selecting means of said selected signal receiving device during the operation of said control means so as to continue to apply to said recording device said signal being received by said selected signal receiving device and thus to avoid the inadvertent changing of said signal during the recording thereof.

6. An apparatus according to claim 5; in which said means for preventing actuation of the signal selecting means of said selected signal receiving device includes a plurality of drive means respectively associated with said plurality of signal receiving devices and being individually engageable with the respective signal selecting means to permit actuation of the latter by way of the respective drive means, and means responsive to said operation of the control means for disengaging said drive means associated with the signal receiving device which is selected by such operation of the control means.

7. An apparatus comprising a magnetic recording device, a plurality of signal receiving devices each including signal selecting means actuable to select the signal received by the respective signal receiving device, control means operable to select one of said signal receiving devices and to apply to said recording device the signal being received by the selected signal receiving device for recording of such signal, a plurality of drive means respectively associated with said plurality of signal receiving devices and being individually engageable with the respective signal selecting means to permit actuation of the latter by way of the respective drive means, and means responsive to the operation of the control means for disengaging said drive means associated with the signal receiving device which is selected by such operation of the control means, whereby to avoid the inadvertent changing of said signal during the recording thereof, and in which each said drive means includes a manually rotatable drive wheel, an idler wheel for providing a driving connection between said drive wheel and the signal selecting means of the associated signal receiving device in the engaged condition of said drive means, and a support member carrying said idler wheel and being movable between an engaged position, in which said idler wheel engages the respective drive wheel and signal selecting means, and a disengaged position, in which said idler wheel is spaced from at least one of said respective drive wheel and signal selecting means; and in which said means for disengaging said drive means includes means selectively acting on the support members of said plurality of drive means for moving only said support member of the drive means associated with said selected signal receiving device to said disengaged position in response to said operation of the control means while the support member of each of the other drive means remains in said engaged position to permit actuation of said signal selecting means of the signal receiving device associated with each of said other drive means.

8. An apparatus according to claim 7; in which said control means includes a master control member movable from an inoperative position to an operative position for initiating recording operation of said recording device, and a plurality of individual control members associated with said plurality of signal receiving devices, respectively, and each movable from an inoperative position to an operative position for selecting the respective signal receiving device to have the signal therefrom applied to said recording device; in which said means selectively acting on the support members of said plurality of drive means includes a plurality of interlock members connected with said support members, respectively, and each being individually displaceable between a normal active position, in which the interlock member is engageable by said master control member to move the respective support member to said disengaged position of the latter in response to movement of said master control member to its operative position, and an inactive position, in which the interlock member is disengaged from said master control member; and in which each of said individual control members has means thereon selectively acting on said interlock members in response to movement of the individual control member to its operative position for displacing to its inactive position each of the interlock members associated with a signal receiving device other than the signal receiving device selected by the operatively positioned individual control member.

9. An appartus according to claim 8; in which said magnetic recording device is also adapted for reproducing operation; and in which said control means further includes record-reproduce switch means for selecting the recording and reproducing operations in response to the movement ov said master control member to its operative and inoperative positions, respectively, and a plurality of individual switch means associated with said individual control members, respectively, and each being active, in response to movement of the resepective individual control member to its operative position, to connect the respective signal receiving device to said recording device through said record-reproduce switch means when the latter selects said recording operation.

10. An apparatus according to claim 9; further comprising monitor means, and monitor switch means for selectively connecting each of said signal receiving devices to said monitor means.

11. An apparatus according to claim 7; in which said drive wheel of each of said drive means has a respective tuning knob connected therewith for effecting the manual rotation of said drive wheel.

12. An apparatus according to claim 7; in which the drive wheels of said plurality of drive means are secured on a common shaft, and a tuning knob is connected with said shaft for effecting the manual rotation of each of said drive wheels.

13. An apparatus according to claim 5; further comprising monitor means, and monitor switch means for selectively connecting each of said signal receiving devices to said monitor means so that the signal being received by any one of said signal receiving devices can be monitored during the recording of the signal received by said selected signal receiving device.

14. In combination, a tunable signal receiver having an adjustable element operable to tune said receiver to any one of plural signal frequencies to receive a signal transmitted at said frequency; drive means included in said signal receiver and coupled to said adjustable element to adjust said element for correspondingly varying the tuning condition of said signal receiver; a recording device for recording a signal applied thereto; switch means for selectively applying the signal received by said signal receiver to said recording device; and drive interrupt means selectively operable when said switch means applies said signal to said recording device for uncoupling said drive means and said adjustable element so as to prevent further adjustment of said element and thereby maintaining said signal receiver substantially tuned at said last-mentioned tuning condition.

* * * * *